(12) United States Patent
Ishibashi et al.

(10) Patent No.: US 11,465,938 B2
(45) Date of Patent: Oct. 11, 2022

(54) MANUFACTURING METHOD OF GLASS PANEL UNIT, MANUFACTURING METHOD OF GLASS WINDOW, AND GLASS PANEL UNIT

(71) Applicant: PANASONIC INTELLECTUAL PROPERTY MANAGEMENT CO., LTD., Osaka (JP)

(72) Inventors: Tasuku Ishibashi, Osaka (JP); Eiichi Uriu, Osaka (JP); Kazuya Hasegawa, Osaka (JP); Masataka Nonaka, Osaka (JP); Hiroyuki Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 417 days.

(21) Appl. No.: 16/338,401

(22) PCT Filed: Sep. 25, 2017

(86) PCT No.: PCT/JP2017/034453
§ 371 (c)(1),
(2) Date: Mar. 29, 2019

(87) PCT Pub. No.: WO2018/062072
PCT Pub. Date: Apr. 5, 2018

(65) Prior Publication Data
US 2020/0039878 A1    Feb. 6, 2020

(30) Foreign Application Priority Data

Sep. 30, 2016   (JP) .............................. JP2016-194691

(51) Int. Cl.
*C03C 27/06* (2006.01)
*E06B 3/663* (2006.01)
*E06B 3/677* (2006.01)

(52) U.S. Cl.
CPC .......... *C03C 27/06* (2013.01); *E06B 3/66304* (2013.01); *E06B 3/677* (2013.01)

(58) Field of Classification Search
CPC ........ E06B 3/677; E06B 3/673; E06B 3/6775; E06B 3/67308; E06B 3/67334;
(Continued)

(56) References Cited

U.S. PATENT DOCUMENTS 6,830,791 B1 * 12/2004 Misonou ............... E06B 3/6715
428/34
10,378,272 B2    8/2019 Abe et al.
(Continued)

FOREIGN PATENT DOCUMENTS

EP    2 851 350 A1    3/2015
EP    3 438 062 A1    2/2019
(Continued)

OTHER PUBLICATIONS

Extended European Search Report issued in corresponding European patent application No. 17856025.6, dated Aug. 30, 2019.
International Search Report and Written Opinion issued in International Patent Application No. PCT/JP2017/034453, dated Nov. 7, 2017; with partial English translation.

*Primary Examiner* — Maria V Ewald
*Assistant Examiner* — Ethan A. Utt
(74) *Attorney, Agent, or Firm* — McDermott Will & Emery LLP

(57) ABSTRACT

A manufacturing method of a glass panel unit of the present invention includes a bonding step, a pressure reduction step, and a sealing step. In the bonding step, a first substrate and a second substrate are hermetically bonded together with a seal having a frame shape. In the pressure reduction step, a pressure in an inside space formed between the first substrate and the second substrate is reduced through an exhaust port. In the sealing step, sealant disposed between the first (Continued)

substrate and the second substrate is deformed, and the sealant thus deformed seals an opening of the exhaust port.

8 Claims, 13 Drawing Sheets

(58) Field of Classification Search
CPC ........ E06B 3/6736; E06B 3/66; E06B 3/6612; E06B 3/675; E06B 3/00; E06B 3/663; E06B 3/66304; E06B 3/67321; E06B 3/67326; C03C 27/00; C03C 27/06; C03C 27/10; Y10T 428/24174; Y10T 428/24182; Y10T 428/24802; Y10T 428/24851; Y10T 428/24868; Y10T 428/24876; Y10T 428/24893; Y10T 428/24901; Y10T 428/24926; B32B 3/00; B32B 3/10; B32B 3/18; B32B 3/22; B32B 17/00; B32B 17/06; B32B 17/068
USPC .............. 65/34; 156/99, 102, 104, 107, 109; 428/34, 119, 120, 195.1, 201, 203, 204, 428/206, 208, 210
See application file for complete search history.

(56) References Cited

U.S. PATENT DOCUMENTS

| | | | |
|---|---|---|---|
| 2002/0121111 A1* | 9/2002 | Yoshizawa | E06B 3/6775 65/34 |
| 2011/0220384 A1* | 9/2011 | Kasahara | H01J 11/10 445/73 |
| 2015/0068666 A1* | 3/2015 | Abe | E06B 3/6612 156/109 |
| 2017/0298681 A1 | 10/2017 | Abe et al. | |
| 2017/0321471 A1 | 11/2017 | Abe et al. | |
| 2018/0038152 A1 | 2/2018 | Nonaka et al. | |
| 2018/0283087 A1 | 10/2018 | Abe et al. | |
| 2019/0084877 A1 | 3/2019 | Abe et al. | |

FOREIGN PATENT DOCUMENTS

| | | |
|---|---|---|
| JP | H06-169850 A | 6/1994 |
| JP | H08-024147 A | 1/1996 |
| JP | 2016-069232 A | 5/2016 |
| WO | 2013/172033 A1 | 11/2013 |
| WO | 2016/051787 A1 | 4/2016 |
| WO | 2016/092849 A1 | 6/2016 |
| WO | 2016/143328 A1 | 9/2016 |

* cited by examiner

MANUFACTURING METHOD OF GLASS PANEL UNIT, MANUFACTURING METHOD OF GLASS WINDOW, AND GLASS PANEL UNIT

CROSS-REFERENCE OF RELATED APPLICATIONS

This application is the U.S. National Phase under 35 U.S.C. § 371 of International Patent Application No. PCT/JP2017/034453, filed on Sep. 25, 2017, which in turn claims the benefit of Japanese Application No. 2016-194691, filed on Sep. 30, 2016, the entire disclosures of which Applications are incorporated by reference herein.

TECHNICAL FIELD

The present invention relates to a glass panel unit having thermal insulation properties and a glass window including the glass panel unit.

BACKGROUND ART

Patent Literature 1 describes a method for fabricating a glass panel unit having thermal insulation properties by bonding a first substrate and a second substrate with a seal. According to this method, a pressure in an inside space formed between the first substrate and the second substrate is reduced through an exhaust port formed in the first substrate or the second substrate, and then, a partition provided in the inside space having the pressure thus reduced is deformed by heating. The partition thus deformed airtightly partitions the inside space into one subspace in which the exhaust port is open and the other subspace. Then, a cutting-off step is performed to remove a part corresponding to the subspace with which the exhaust port communicates, thereby obtaining a glass panel unit.

In the above-described known manufacturing method of a glass panel unit, the cutting-off step has to be performed to obtain the glass panel unit. This leads to a reduced usage efficiency of materials. Moreover, when at least one of the first substrate and the second substrate is made of strengthened glass, cutting-off is not easy.

CITATION LIST

Patent Literature

Patent Literature 1: JP 2016-69232 A

SUMMARY OF INVENTION

It is an object of the present invention to efficiently manufacture a glass panel unit and a glass window having thermal insulation properties without the cutting-off step.

A manufacturing method of a glass panel unit of one aspect of the present invention includes a bonding step, a pressure reduction step, and a sealing step. The bonding step is a step of hermetically bonding a first surface on one side in a thickness direction of a first substrate and a second surface on one side in a thickness direction of a second substrate together with a seal having a frame shaped. The first substrate includes at least a glass pane. The second substrate includes at least a glass pane. The pressure reduction step is a step of reducing a pressure in an inside space surrounded by the first surface, the second surface, and the seal through an exhaust port formed in the first substrate or the second substrate. The sealing step is a step of sealing the exhaust port with a reduced pressure in the inside space being maintained.

In the sealing step, sealant disposed between the first surface and the second surface is deformed, and the sealant thus deformed seals an opening of the exhaust port.

A manufacturing method of a glass window one of another aspect of the present invention includes a fitting step of fitting a window frame to the glass panel unit manufactured by the manufacturing method of the glass panel unit of the one aspect of the present invention.

A glass panel unit one of still another aspect of the present invention includes: a first substrate including at least a glass pane; a second substrate including at least a glass pane; a frame member hermetically bonded to a peripheral portion of the first substrate and a peripheral portion of the second substrate; an exhaust port formed in the first substrate or the second substrate; and an inside space surrounded by the first substrate, the second substrate, and the frame member and having a reduced pressure. The exhaust port is sealed with a part of the frame member.

DESCRIPTION OF EMBODIMENTS

[Glass Panel Unit]

First Embodiment

With reference to FIGS. 1 to 4, a glass panel unit 9 of a first embodiment and a manufacturing method thereof will be described.

Figure 2:
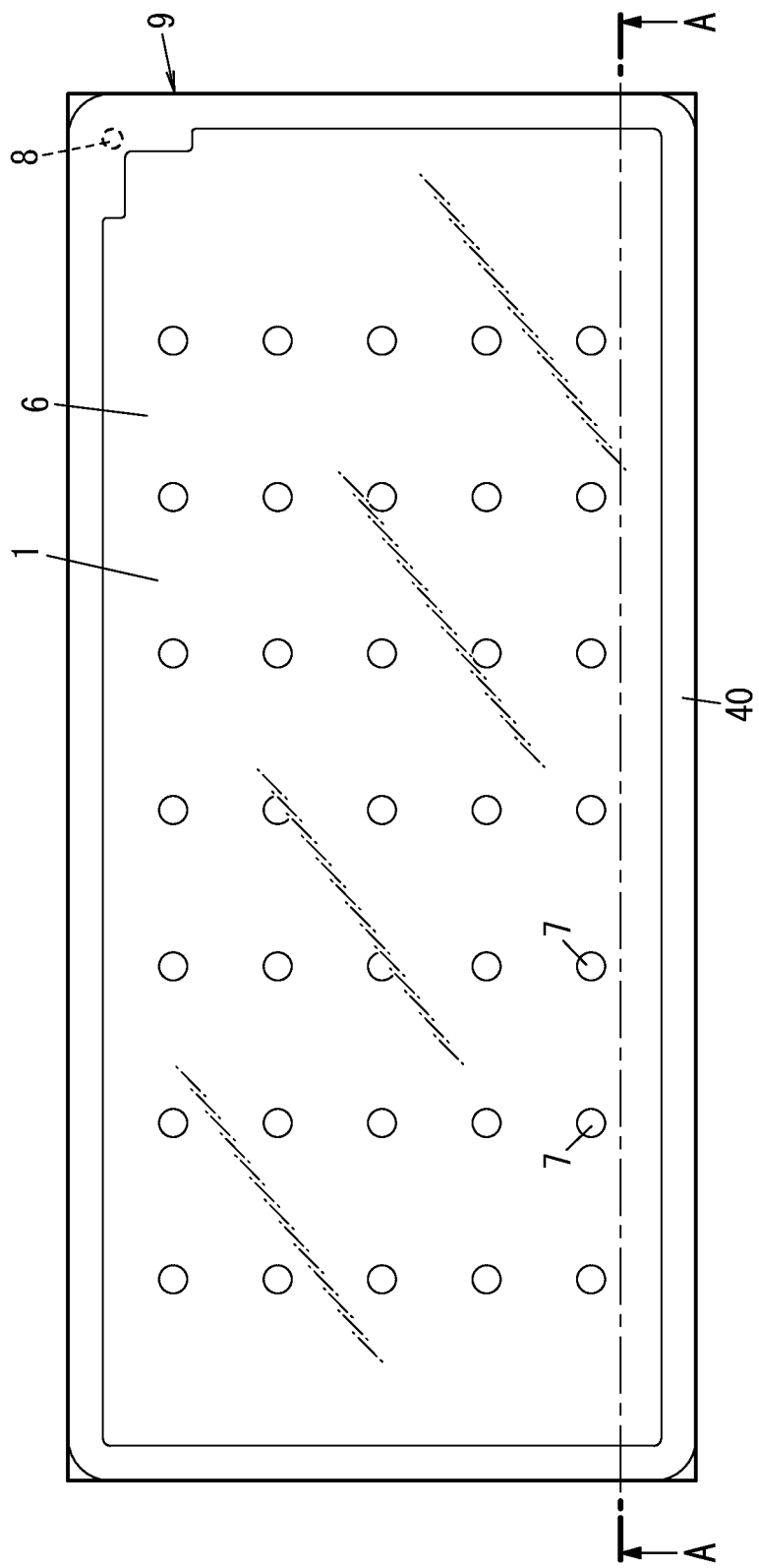
FIG. 2 is a plan view schematically illustrating a glass panel unit manufactured by the manufacturing method.
Figure 3:
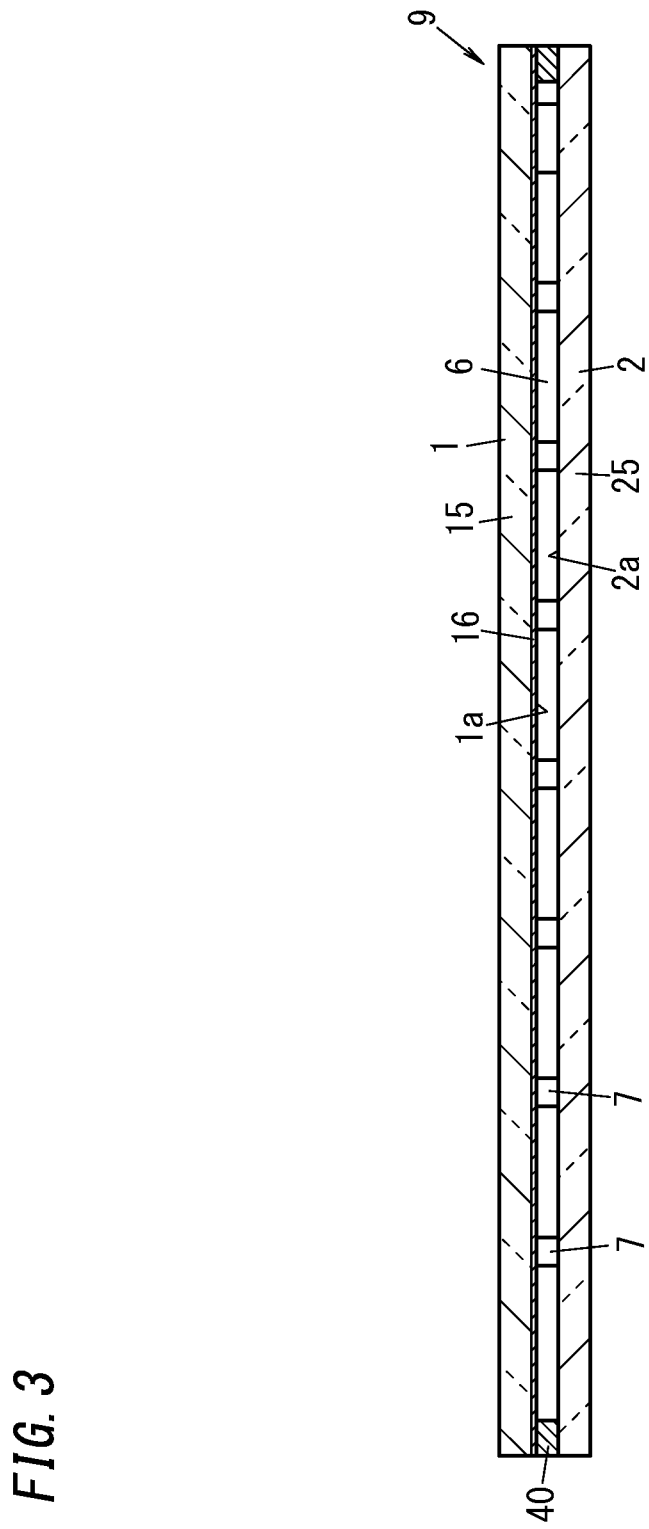
FIG. 3 is a sectional view taken along line A-A of FIG. 2.

As illustrated in FIGS. 2 and 3, the glass panel unit 9 of the first embodiment includes a first substrate 1, a second substrate 2, a frame member 40, and a plurality of (a large number of) pillars 7.

The first substrate 1 includes a glass pane 15 having a flat-plate shape and a coating 16 covering a first side in a thickness direction of the glass pane 15. The coating 16 is, for example, a solar reflective film but may be a film having other physical properties. In the first substrate 1, an appropriate coating may be applied not to the first side in the thickness direction of the glass pane 15 but to a second side (on an opposite side of the glass pane 15 from the first side), or an appropriate coating may be applied to both the first side and the second side in the thickness direction of the glass pane 15.

In the glass panel unit 9 of the first embodiment, one surface in a thickness direction of the first substrate 1 (hereinafter referred to as a "first surface 1a") corresponds to a surface of the coating 16. When the glass pane 15 is not provided with the coating 16, the first surface 1a of the first substrate 1 corresponds to one surface in the thickness direction of the glass pane 15. The first substrate 1 includes at least the glass pane 15. The first substrate 1 is transparent generally but may be semi-transparent or non-transparent.

The second substrate 2 includes a glass pane 25 having a flat-plate shape. One surface in a thickness direction of the second substrate 2 (hereinafter referred to as a "second surface 2a") corresponds to one surface in a thickness direction of the glass pane 25. The second substrate 2 includes at least the glass pane 25, and an appropriate coating may be applied to one or both sides in the thickness direction of the glass pane 25. The second substrate 2 is transparent generally but may be semi-transparent or non-transparent.

The frame member 40 has a rectangular frame-like outer shape. The frame member 40 includes a product obtained by melting and then solidifying a seal 4 (see FIG. 1) having a frame shape and containing glass frit and a product obtained by deforming sealant 5 disposed at a location surrounded by the seal 4. The sealant 5 is deformed to be integrated with the seal 4.

The frame member 40 is located to be sandwiched between the first substrate 1 and the second substrate 2 which are disposed to face each other. The frame member 40 is hermetically bonded to an entire peripheral portion of the first surface 1a of the first substrate 1 and is hermetically bonded to an entire peripheral portion of the second surface 2a of the second substrate 2.

As described later, a deformed part of the sealant 5 of the frame member 40 closes an opening of an exhaust port 8 formed in the second substrate 2.

In the glass panel unit 9 of the first embodiment, an inside space 6 surrounded by the first substrate 1, the second substrate 2, and the frame member 40 is hermetically sealed with the pressure therein being reduced to a prescribed degree of vacuum. The first surface 1a of the first substrate 1 faces the inside space 6. The second surface 2a of the second substrate 2 faces the inside space 6.

The plurality of pillars 7 are located to be sandwiched between the first substrate 1 and the second substrate 2 which are disposed to face each other. The plurality of pillars 7 are located to be enclosed by the frame member 40. That is, the plurality of pillars 7 are disposed in the inside space 6. Each pillar 7 is in contact with the first surface 1a of the first substrate 1 and the second surface 2a of the second substrate 2, and thereby, a gap between the first substrate 1 and the second substrate 2 is maintained as a prescribed space.

Figure 1:
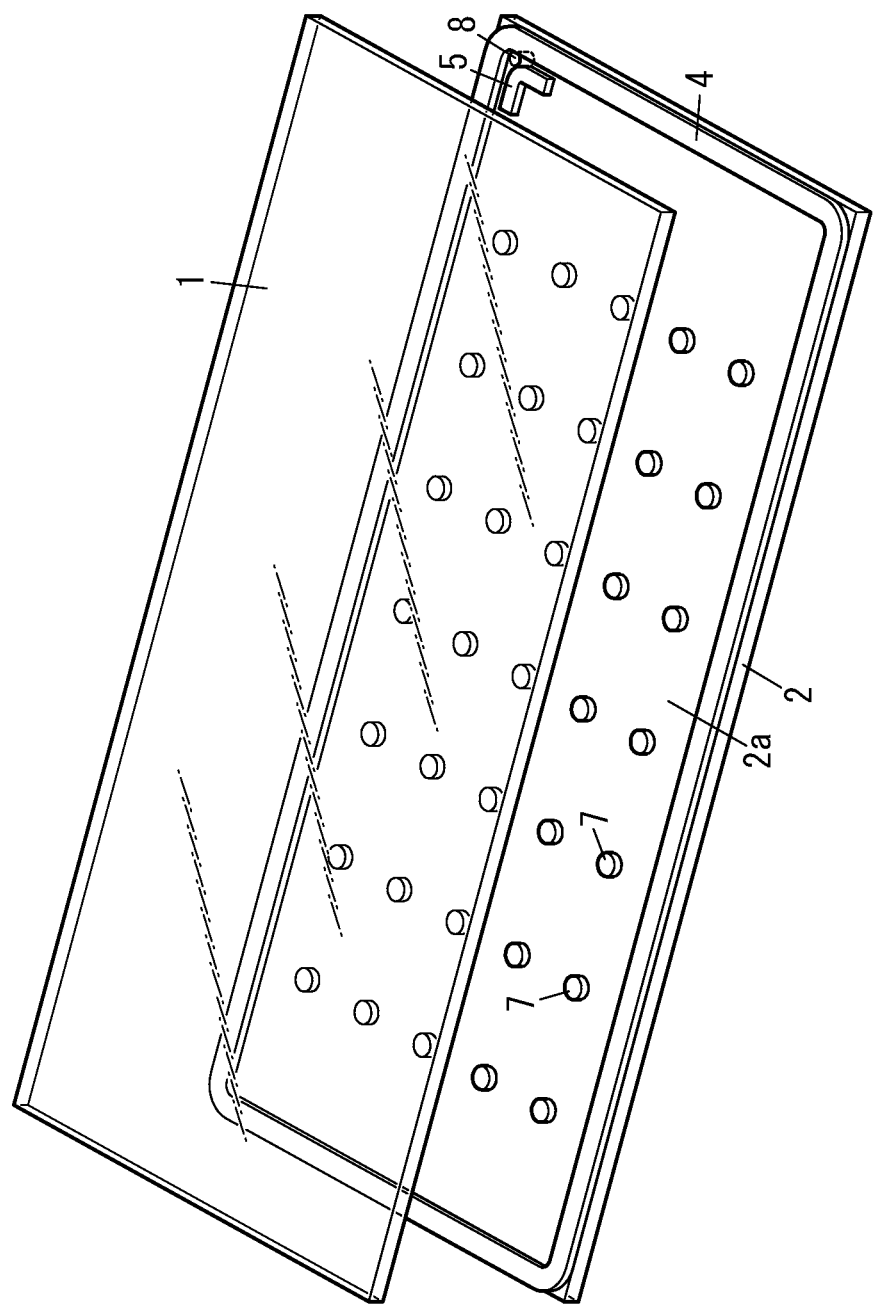
FIG. 1 is a perspective view schematically illustrating a step of a manufacturing method of a glass panel unit of a first embodiment.

In FIGS. 1 to 3, components are schematically illustrated. For example, the dimensional shape of each pillar 7, the gap between each two adjacent pillars 7, the thicknesses of the first substrate 1 and the second substrate 2, the volume of the inside space 6, and the like are different from actual ones. The number of the pillars 7 is not limited to that shown in the figure. There may be a case where no pillar 7 is disposed between the first substrate 1 and the second substrate 2.

Next, a manufacturing method of a glass panel unit of the first embodiment (hereinafter simply referred to as a "first manufacturing method") will be described.

Figure 4:
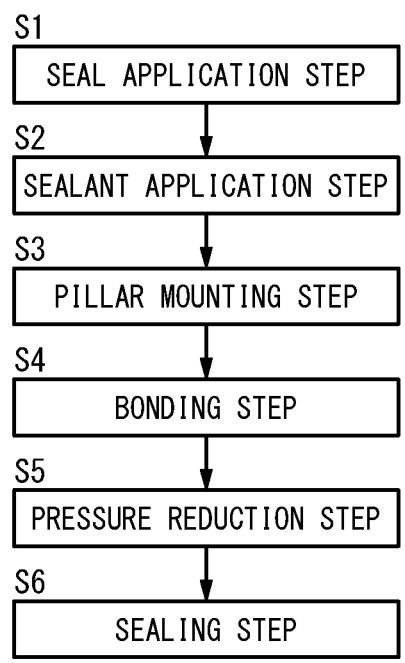
FIG. 4 is a flow diagram illustrating the manufacturing method.

The first manufacturing method includes a seal application step S1, a sealant application step S2, a pillar mounting step S3, a bonding step S4, a pressure reduction step S5, and a sealing step S6 (see FIG. 4).

Any one of the seal application step S1, the sealant application step S2, and the pillar mounting step S3 may be performed in advance or at least two of these steps may be concurrently performed.

First, the seal application step S1 will be described.

In the seal application step S1, as illustrated in FIG. 1, the seal 4 containing glass frit is applied to a peripheral portion of the second surface 2a on one side in the thickness direction of the second substrate 2 to have a rectangular frame shape.

Next, the sealant application step S2 will be described.

In the sealant application step S2, as illustrated in FIG. 1, the sealant 5 containing glass frit is applied to the second surface 2a of the second substrate 2 to have an L-shape in plan view. The sealant 5 is higher in melting temperature (softening point) than the seal 4.

When at least the seal application step S1 and the sealant application step S2 are completed, as illustrated in FIG. 1, the seal 4 and the sealant 5 are disposed on the second surface 2a of the second substrate 2. The sealant 5 having an L shape is located on an inner side of a corner section of the seal 4 having a rectangular frame shape with a space from the seal 4. The space has an L shape and is small.

The exhaust port 8 is formed in the second substrate 2 to penetrate therethrough in the thickness direction. The exhaust port 8 is open in the space having the L shape between the seal 4 and the sealant 5. The opening of the exhaust port 8 is preferably located in a central part (corner part) of the space having the L shape.

In a pillar mounting step S3, the plurality of pillars 7 are mounted on the second surface 2a of the second substrate 2 according to a prescribed pattern. When at least the seal application step S1 and the pillar mounting step S3 are completed, the plurality of pillars 7 are located to be enclosed by the seal 4.

After the seal application step S1, the sealant application step S2, and the pillar mounting step S3 are completed, the bonding step S4 is performed. In the bonding step S4, the first substrate 1 and the second substrate 2 with the seal 4 sandwiched therebetween are prepared as a set, the entirety of which is heated in a furnace at a first temperature. The first temperature is a temperature at which the seal 4 is melted by being heated.

In the bonding step S4, the seal 4 is once melted in the furnace and is then solidified along with a temperature drop, and thereby, the first substrate 1 and the second substrate 2 are hermetically bonded together with the seal 4. The inside space 6 hermetically surrounded by the seal 4 is formed between the first substrate 1 and the second substrate 2 bonded together. The inside space 6 is in communication with an outside space through the exhaust port 8.

After the bonding step S4, the pressure reduction step S5 is performed. In the pressure reduction step S5, air in the inside space 6 is exhausted to the outside through the exhaust port 8, and the pressure in the entirety of the inside space 6 is reduced to achieve a prescribed degree of vacuum (e.g., degree of vacuum lower than or equal to 0.1 Pa). At this time, the sealant 5 is located to extend along the seal 4 in the inside space 6, and the opening of the exhaust port 8 is located at the space between the corner section of the seal 4 and the sealant 5. The exhausting process through the exhaust port 8 is performed by a vacuum pump or the like via, for example, an exhaust pipe (not shown) detachably connected to the second substrate 2 to be in communication with the exhaust port 8.

Note that at this step, when the seal 4, the sealant 5, and the plurality of pillars 7 are located as described above between the first substrate 1 and the second substrate 2, the seal 4 may be applied to any of the first surface 1a and the second surface 2a in the seal application step S1, the sealant 5 may be applied to any of the first surface 1a and the second surface 2a in the sealant application step S2, and the plurality of pillars 7 may be mounted on any of the first surface 1a and the second surface 2a in the pillar mounting step S3. Also, the exhaust port 8 may be formed in any of the first substrate 1 and the second substrate 2.

After the pressure in the inside space 6 is reduced to the prescribed degree of vacuum, the sealing step S6 is performed. In the sealing step S6, all the components mentioned above are heated at a second temperature in a furnace with the reduced pressure in the inside space 6 being maintained. The second temperature is a temperature at which the sealant 5 is melted by being heated. After heating at the second temperature melts the sealant 5, and the sealant 5 deforms to close the opening of the exhaust port 8, the sealant 5 solidifies as along with a temperature drop (see FIG. 2). That is, a deformed part of the sealant 5 overlaps the exhaust port 8 in plan view, and thereby, the inside space 6 having the reduced pressure is airtightly sealed from the outside space.

The first temperature is preferably set to be higher than the second temperature. When the melting temperature of the sealant 5 is higher than the melting temperature of the seal 4, and the second temperature is set to be higher than the first temperature, deformation of the sealant 5 is suppressed in the bonding step S4, and the sealant 5 is easily deformed as desired in the sealing step S6.

In the sealing step S6, not all the components have to be heated in the furnace, but the sealant 5 may be externally irradiated with infrared radiation to locally heat the sealant 5 to the second temperature. The infrared radiation is preferably near infrared radiation.

Performing the steps described above provides the glass panel unit 9 having the inside space 6 having the reduced pressure.

Figure 5A:
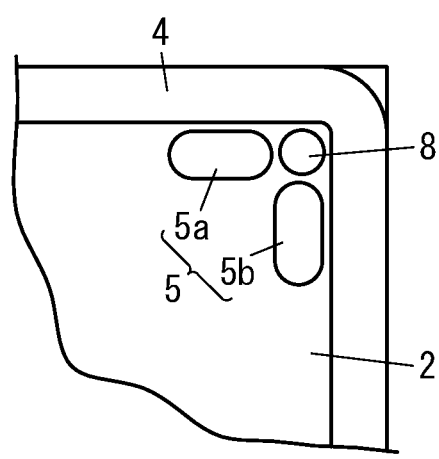
FIG. 5A is a plan view schematically illustrating a main part in a step in a variation of the manufacturing method.
Figure 5B:
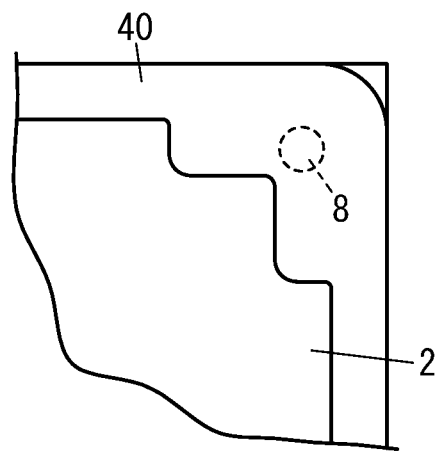
FIG. 5B is a plan view schematically illustrating the main part of a glass panel unit manufactured according to the variation.

In FIGS. 5A and 5B, a variation of the first manufacturing method is shown. In the variation, as illustrated in FIG. 5A, the sealant 5 is not applied to one location in L-shape but pieces of the sealant 5 are applied as lines or dots at a plurality of locations (two locations). In the variation, pieces of sealant 5a and 5b applied to the plurality of locations form the sealant 5.

Also in the variation, the sealant 5 deformed by being heated (i.e., a part of the frame member 40 formed by eventually integrating the sealant 5 and the seal 4) seals the opening of the exhaust port 8.

Note that the sealant 5 is not limited to the above configuration. The sealant 5 may be disposed to have an appropriate form at one or more locations in the vicinity of the opening of the exhaust port 8 and adjacent to the seal 4. Integrating the sealant 5 deformed with the seal 4 is not essential, but the sealant 5 deformed does not have to be integrated with the seal 4.

Second Embodiment

Figure 6:
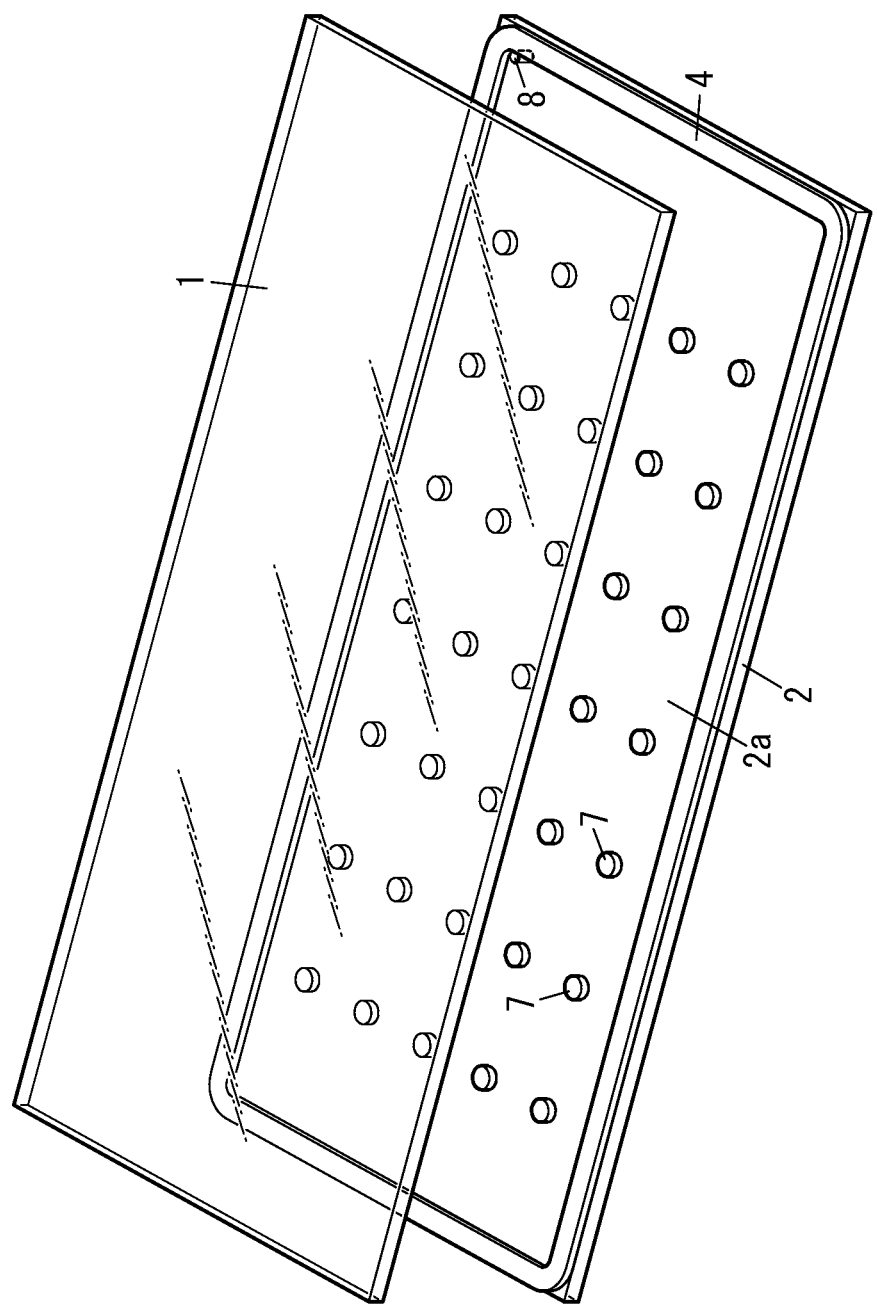
FIG. 6 is a perspective view schematically illustrating a step of a manufacturing method of a glass panel unit of a second embodiment.
Figure 7:
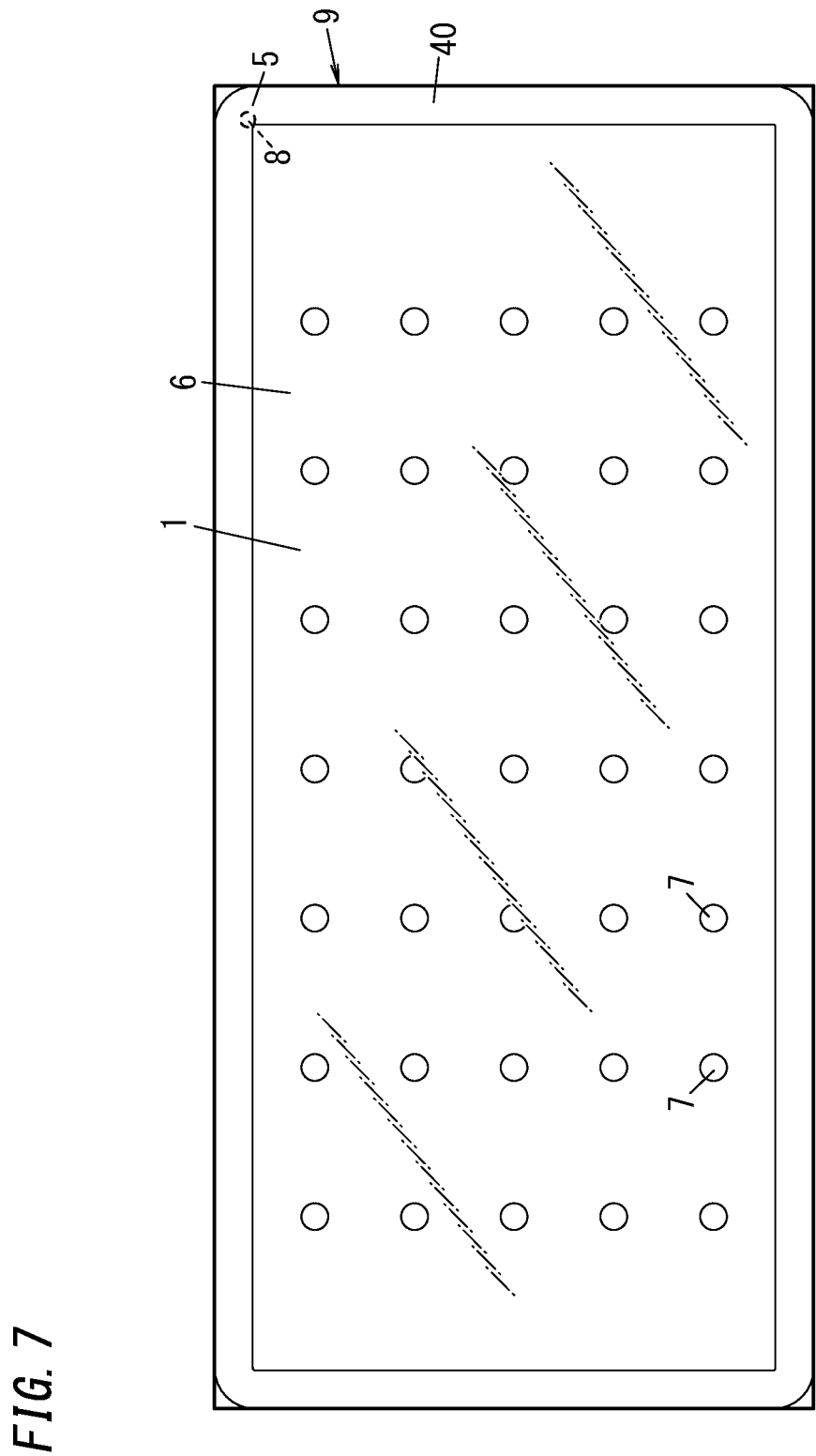
FIG. 7 is a plan view schematically illustrating a glass panel unit manufactured by the manufacturing method; of the second embodiment.
Figure 8:
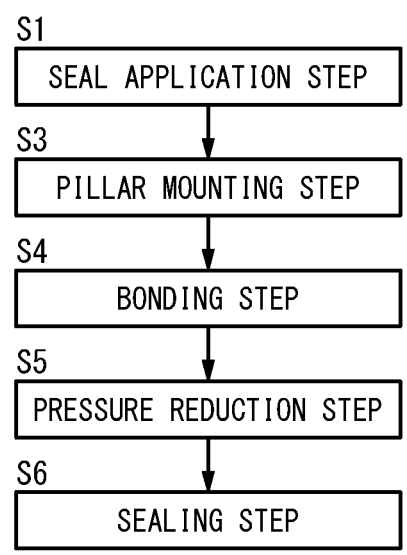
FIG. 8 is a flow diagram illustrating the manufacturing method of the second embodiment.

With reference to FIGS. 6 to 8, a glass panel unit 9 of a second embodiment and a manufacturing method thereof will be described. Note that components similar to those in the first embodiment are denoted by the same reference signs, and the detailed description thereof will be omitted.

The glass panel unit 9 of the second embodiment includes a first substrate 1, a second substrate 2, a frame member 40, and a plurality of (a large number of) pillars 7. In the second embodiment, an opening of an exhaust port 8 is closed with a section (L-shaped corner section) of the frame member 40 having a rectangular frame shape.

A manufacturing method of a glass panel unit of the second embodiment (hereinafter simply referred to as "second manufacturing method") includes a seal application step S1, a pillar mounting step S3, a bonding step S4, a pressure reduction step S5, and a sealing step S6 (see FIG. 8).

In the bonding step S4 of the second manufacturing method, the first substrate 1 and the second substrate 2 are hermetically bonded together with a seal 4, which has been once melted and has then been solidified. In this stage, the opening of the exhaust port 8 is not closed, and the inside space 6 is in communication with an outside space through the exhaust port 8.

In the pressure reduction step S5 of the second manufacturing method, air in the inside space 6 is exhausted to the outside through the exhaust port 8.

Note that in this stage, when a seal 4 and a plurality of pillars 7 are located between the first substrate 1 and the second substrate 2, the plurality of pillars 7 are located in an inside space 6 surrounded by the seal 4, and the opening of the exhaust port 8 is located on an inner side of the seal 4, the seal 4 may be applied to any of the first surface 1a and the second surface 2a in the seal application step S1, and the plurality of pillars 7 may be mounted on any of the first surface 1a and the second surface 2a in the pillar mounting step S3. Also, the exhaust port 8 may be formed in any of the first substrate 1 and the second substrate 2.

The opening of the exhaust port 8 is preferably located on an inner side of the L-shaped corner section of the seal 4.

In the sealing step S6, the seal 4 deforms to close the opening of the exhaust port 8 with the reduced pressure in the inside space 6 being maintained, and a deformed part of the seal 4 airtightly seals the inside space 6 having the reduced pressure. That is, in the second manufacturing method, a part of the seal 4 also serves as sealant 5.

The deformation of the seal 4 is realized by, for example, heating the seal 4 again to melt (soften) the seal 4. In the sealing step S6, since the inside space 6 has the reduced pressure, the seal 4 melted is pressed between the first substrate 1 and the second substrate 2 and deforms to extend its width. The heating temperature of the seal 4 in the sealing step S6 is also preferably different from the heating temperature of the seal 4 in the bonding step S4. For example, the heating temperature of the seal 4 in the sealing step S6 may be set to a higher temperature than the heating temperature of the seal 4 in the bonding step S4, or the heating temperature of the seal 4 in the sealing step S6 may be set to a lower temperature than the heating temperature of the seal 4 in the bonding step S4.

In the sealing step S6, the seal 4 may be heated at the second temperature, and force may be externally applied to the seal 4.

In the sealing step S6, not all the components have to be heated in the furnace, but at least a part of the seal 4 may be irradiated with infrared radiation to locally heat the part of the seal 4 to the second temperature. The infrared radiation is preferably near infrared radiation.

Performing the steps described above provides the glass panel unit 9 having the inside space 6 having the reduced pressure.

The seal 4 shown in FIG. 6 has a uniform width over its entire perimeter. However, for example, a part of the seal 4 in the vicinity of the exhaust port 8 may preferably be larger in width than the other parts of the seal 4. Thus, a deformed part of the seal 4 (part in the vicinity of the exhaust port 8) easily seals the opening of the exhaust port 8.

Third Embodiment

Figure 9:
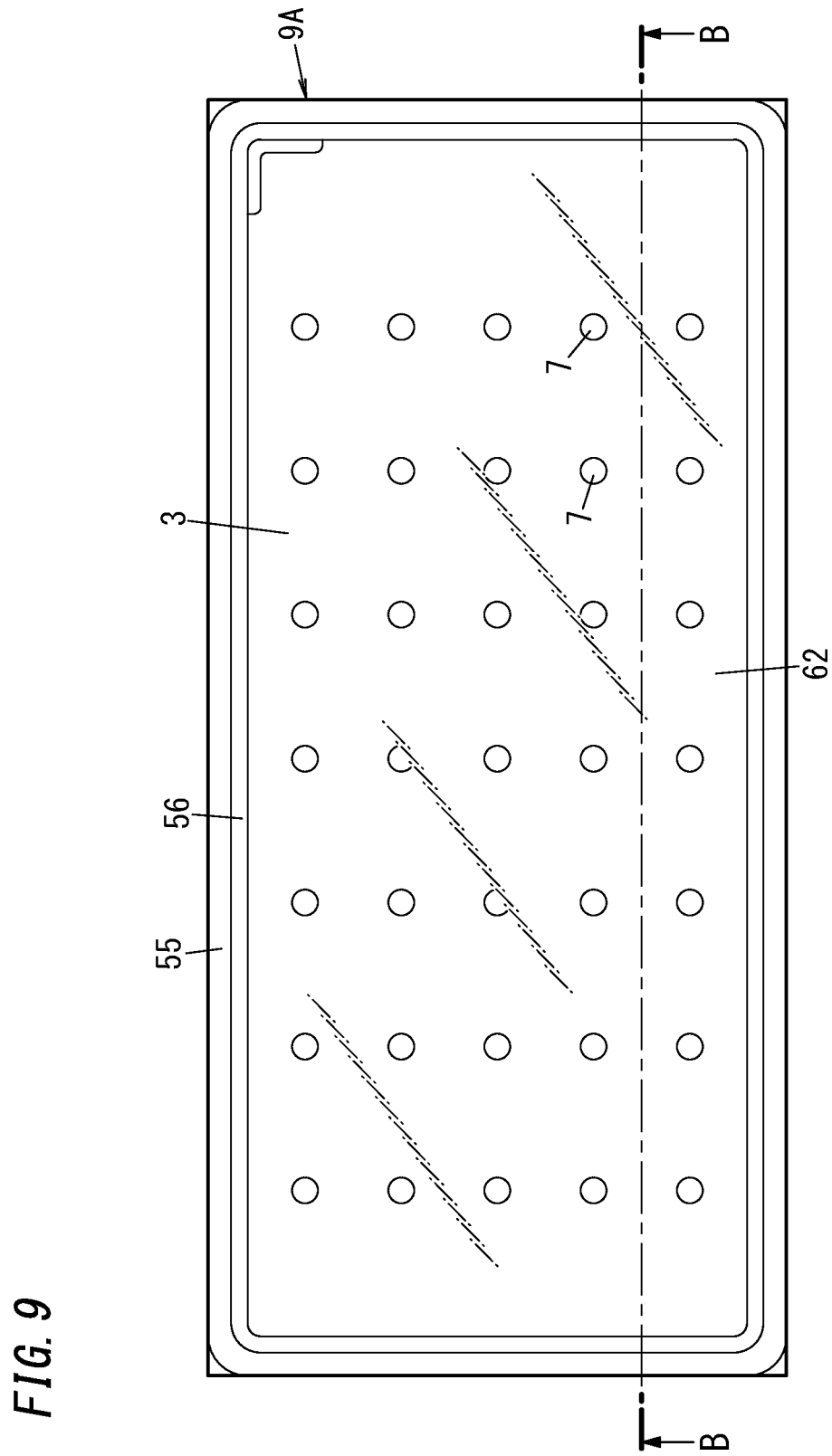
FIG. 9 is a plan view schematically illustrating a glass panel unit manufactured by a manufacturing method of a glass panel unit of a third embodiment.
Figure 10:
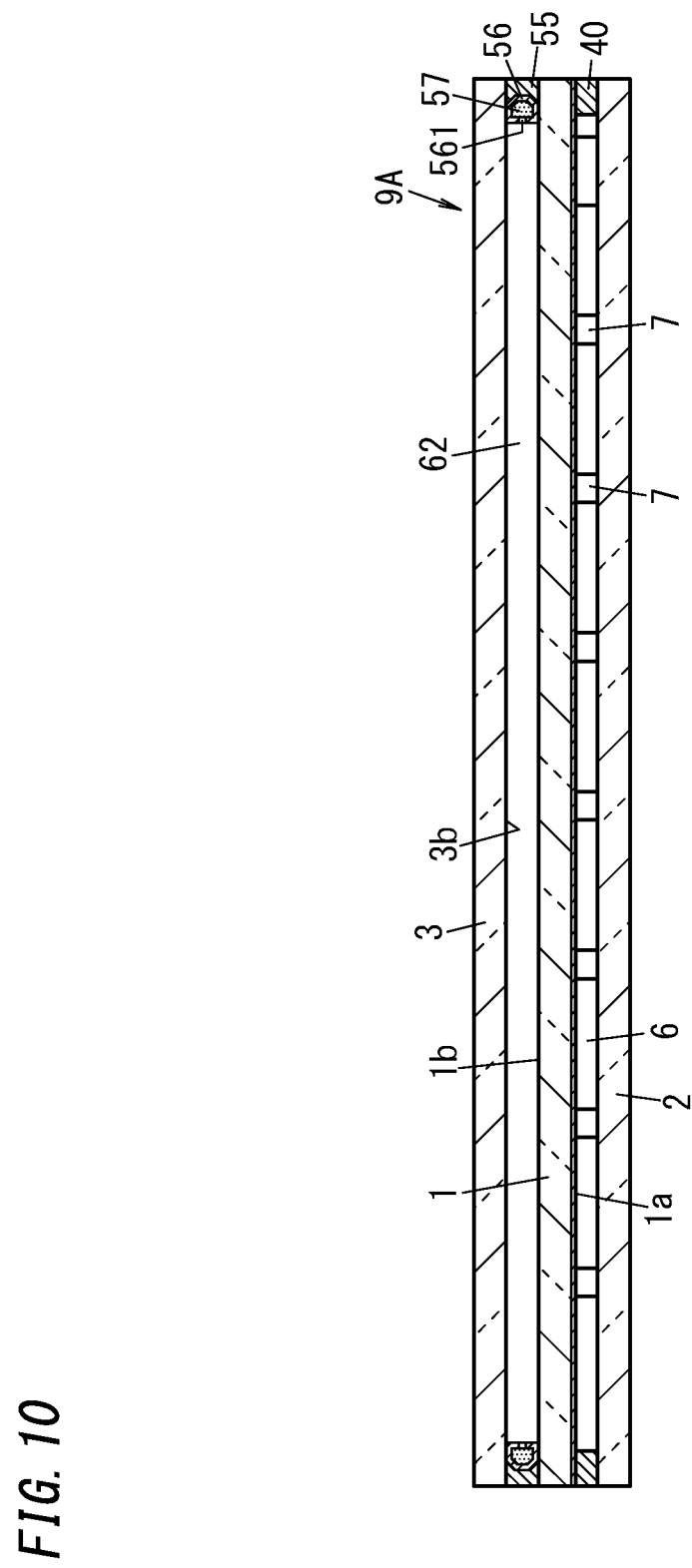
FIG. 10 is a sectional view taken along line B-B of FIG. 9.
Figure 11:
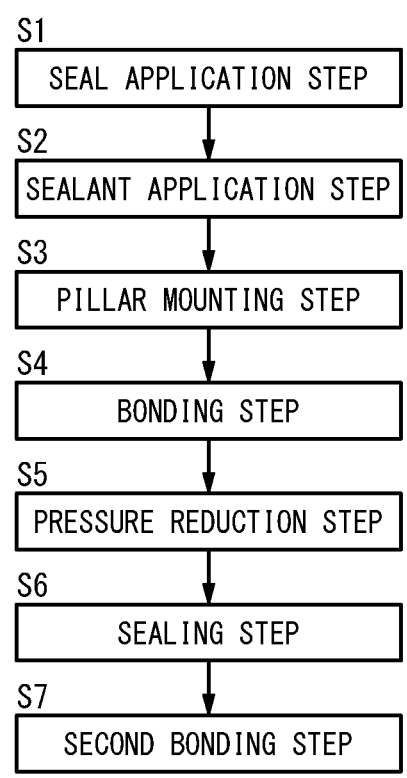
FIG. 11 is a flow diagram illustrating the manufacturing method of the third embodiment.

With reference to FIGS. 9 to 11, a glass panel unit 9A of a third embodiment and a manufacturing method thereof will be described. Note that components similar to those in the first embodiment are denoted by the same reference signs, and the detailed description thereof will be omitted.

The glass panel unit 9A of the third embodiment includes a third substrate 3 provided to face the first substrate 1 and a frame member 55 in addition to the components of the glass panel unit 9 of the first embodiment. The frame member 55 hermetically bonds entire peripheral portions of the first substrate 1 and the third substrate 3.

Similarly to the first substrate 1 and the second substrate 2, any appropriate panel may be adopted as the third substrate 3 as long as the third substrate 3 includes at least a glass pane. The third substrate 3 is transparent generally but may be semi-transparent or non-transparent.

A space 62 which is hermetically sealed is formed between counter surfaces 1b and 3b respectively of the first substrate 1 and the third substrate 3.

The third substrate 3 is disposed to face one substrate of the first substrate 1 and the second substrate 2. Although not shown in the figure, when the third substrate 3 is disposed to face the second substrate 2, the frame member 55 is bonded to peripheral portions of the second substrate 2 and the third substrate 3, and the space 62 which is sealed is formed between the second substrate 2 and the third substrate 3.

As illustrated in FIG. 10, a spacer 56 is further disposed on an inner side of the frame member 55. The spacer 56 has a frame shape having a hollow. The hollow of the spacer 56 is filled with desiccant 57.

The spacer 56 is made of metal such as aluminum and has a through hole 561 on an inner circumferential side thereof. The hollow of the spacer 56 is in communication with the space 62 via a through hole 561. The desiccant 57 is, for example, silica gel. The frame member 55 is preferably made of, for example, a highly airtight resin such as a silicon resin and butyl rubber.

The space 62 is a space sealed with the first substrate 1 (or the second substrate 2), the third substrate 3, and the frame member 55. The space 62 is filled with a dry gas. The dry gas is, for example, a dry rare gas such as argon gas or dry air. The dry air includes air dried after sealed in the space 62 due to the effect of the desiccant 57.

In the glass panel unit 9A of the third embodiment, an inside space 6 having a pressure reduced to a prescribed degree of vacuum and the space 62 filled with the dry gas are located between the third substrate 3 and the second substrate 2 (or the first substrate 1) which are located on both ends in a thickness direction of the glass panel unit 9A. Thus, the glass panel unit 9A of the third embodiment exhibits a further high thermal insulation property.

As illustrated in FIG. 11, a manufacturing method of a glass panel unit of the third embodiment includes a second bonding step S7 in addition to the steps in the first manufacturing method. The second bonding step S7 is a step of disposing the third substrate 3 to sandwich the frame member 55 and the spacer 56 between the third substrate 3 and one substrate of the first substrate 1 and the second substrate 2 to bond the one substrate and the third substrate 3 together with the frame member 55.

In this embodiment, the manufacturing method of the glass panel unit of the third embodiment has been described as a method of stacking the third substrate 3 on the glass panel unit 9 of the first embodiment. However, the third substrate 3 may be stacked on the glass panel unit 9 of the second embodiment.

[Glass Window]

Figure 12:
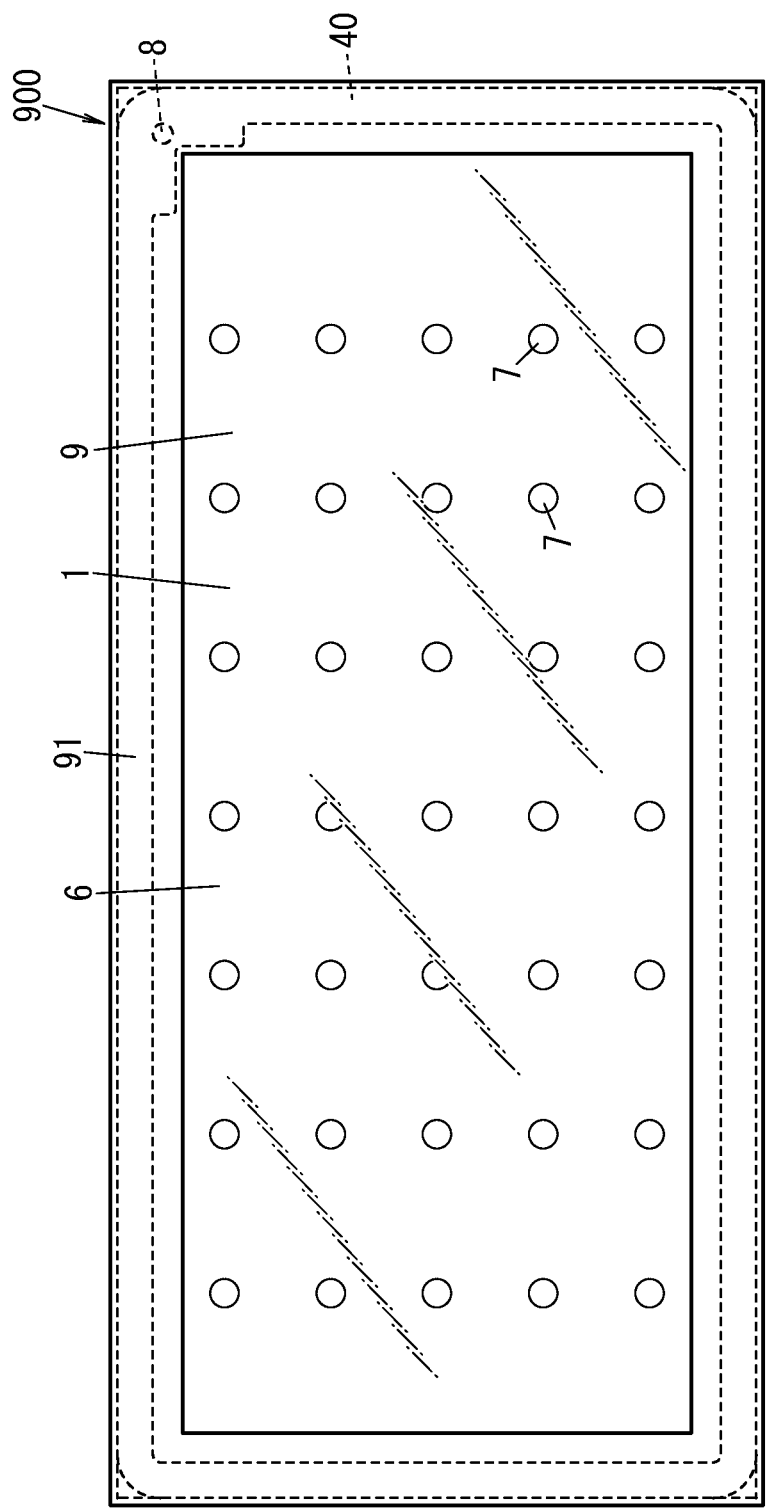
FIG. 12 is a plan view schematically illustrating a glass window including the glass panel unit of the first embodiment.

FIG. 12 shows a glass window 900 obtained by fitting a window frame 91 to the glass panel unit 9 of the first embodiment. The glass window 900 has a structure in which the window frame 91 having a rectangular frame shape is fit to a peripheral portion of the glass panel unit 9 having a rectangular shape in plan view. The glass window 900 has a high thermal insulation property. In the glass window 900, when viewed from the front side, the frame member 40 of the glass panel unit 9 is preferably hidden by the window frame 91.

Figure 13:
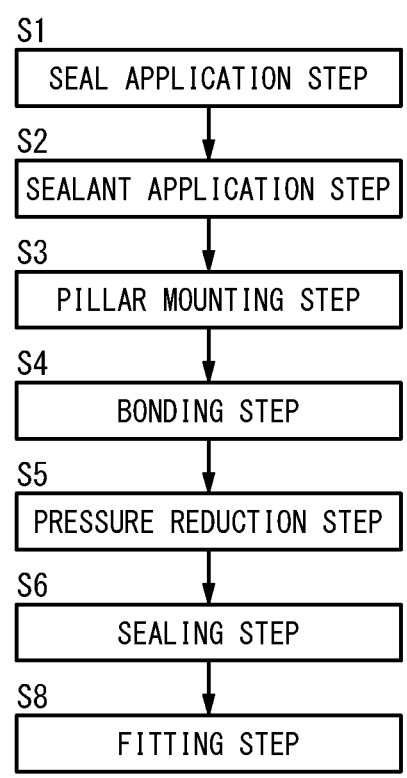
FIG. 13 is a flow diagram illustrating a manufacturing method of the glass window.

As illustrated in FIG. 13, a manufacturing method of the glass window 900 includes a fitting step S8 of fitting the window frame 91 to the glass panel unit 9 in addition to the steps of the first manufacturing method.

A target to which the window frame 91 is fitted is not limited to the glass panel unit 9 of the first embodiment. The window frame 91 may be fitted to the glass panel unit 9 of the second embodiment. Alternatively, the window frame 91 may be fitted to the glass panel unit 9A of the third embodiment. In each case, a glass window 900 having a high thermal insulation property is obtained.

[Effects]

As can be seen from each of the above-described embodiments, a manufacturing method of a glass panel unit of a first aspect includes a bonding step S4, a pressure reduction step S5, and a sealing step S6.

The bonding step S4 is a step of hermetically bonding a first surface 1a on one side in a thickness direction of a first substrate 1 and a second surface 2a on one side in a thickness direction of a second substrate 2 together with a seal 4 having a frame shape. The first substrate 1 includes at least a glass pane 15. The second substrate 2 includes at least a glass pane 25.

The pressure reduction step S5 is a step of reducing a pressure in an inside space 6 surrounded by the first surface 1a, the second surface 2a, and the seal 4 through an exhaust port 8 formed in the first substrate 1 or the second substrate 2. The sealing step S6 is a step of sealing the exhaust port 8 with a reduced pressure in the inside space 6 being maintained.

In the sealing step S6, sealant 5 disposed between the first surface 1a and the second surface 2a is deformed, and the sealant 5 thus deformed seals an opening of the exhaust port 8.

The manufacturing method of the glass panel unit of the first aspect enables efficient manufacturing of a glass panel unit 9 having thermal insulation properties without performing a cutting-off step as in the prior art technique. This provides the advantage that even when at least one of the first substrate 1 and the second substrate 2 is made of strengthened glass, a glass panel unit 9 is efficiently manufactured and the advantage that the usage efficiency of materials is increased.

In a manufacturing method of a glass panel unit of a second aspect referring to the first aspect, in the pressure reduction step S5, the sealant 5 is disposed in the inside space 6 and along the seal 4, and the opening of the exhaust port 8 is located at a space between the sealant 5 and the seal 4.

In the manufacturing method of the glass panel unit of the second aspect, the exhaust port 8 is closed with the sealant 5 different from the seal 4, and even when the exhaust port 8 has a relatively large opening, the opening is easily sealed.

In a manufacturing method of a glass panel unit of a third aspect referring to the second aspect, in the pressure reduction step S5, the space is formed between the sealant 5 having an L-shape and an L-shaped corner section of the seal 4.

Thus, according to the manufacturing method of the glass panel unit of the third aspect, even when the exhaust port 8 has a relatively large opening, the opening is easily sealed.

In a manufacturing method of a glass panel unit of a fourth aspect referring to the second or third aspect, in the bonding step S4, the first surface 1a and the second surface 2a are bonded together with the seal 4 heated at a first temperature, and in the sealing step S6, the sealant 5 is heated at a second temperature higher than the first temperature to deform the sealant 5.

Thus, according to the manufacturing method of the glass panel unit of the fourth aspect, the bonding of the first surface 1a and the second surface 2a in the bonding step S4 and the sealing of the exhaust port 8 in the sealing step S6 are both controlled by external heating.

In a manufacturing method of a glass panel unit of a fifth aspect referring to the first aspect, the seal 4 has a part also serving as the sealant 5. In the sealing step S6, the part of the seal 4 is deformed to seal the opening of the exhaust port 8.

Thus, according to the manufacturing method of the glass panel unit of the fifth aspect, the exhaust port 8 is closed without providing the sealant 5 additionally to the seal 4.

In a manufacturing method of a glass panel unit of a sixth aspect referring to the fifth aspect, in the bonding step S4, the first surface 1a and the second surface 2a are bonded together with the seal 4 solidified after being heated and melted, and in the sealing step S6, the seal 4 is heated and melted again to deform the part of the seal 4.

Thus, according to the manufacturing method of the glass panel unit of the sixth aspect, the bonding of the first surface 1a and the second surface 2a in the bonding step S4 and the sealing of the exhaust port 8 in the sealing step S6 are both controlled by external heating.

A manufacturing method of a glass panel unit of a seventh aspect referring to any one of the first to sixth aspect further includes a second bonding step S7. The second bonding step S7 is a step of bonding a third substrate 3 and one of the first substrate 1 and the second substrate 2 together with a frame member 55.

Thus, according to the manufacturing method of the glass panel unit of the seventh aspect, it is possible to manufacture a glass panel unit 9A having a further high thermal insulation property.

Moreover, a manufacturing method of a glass window of a first aspect includes a fitting step S8 of fitting a window frame 91 to the glass panel unit 9, 9A manufactured by the manufacturing method of the glass panel unit of any one of the first to seventh aspects.

Thus, the manufacturing method of the glass window of the first aspect enables efficient manufacturing of a glass window 900 having a high thermal insulation property.

Moreover, a glass panel unit 9 of a first aspect includes: a first substrate 1 including least a glass pane 15; a second substrate 2 including at least a glass pane 25; a frame member 40 hermetically bonded to a peripheral portion of the first substrate 1 and a peripheral portion of the second substrate 2; an exhaust port 8 formed in the first substrate 1 or the second substrate 2; and an inside space 6 in a reduced-pressure state, the inside space 6 being surrounded by the first substrate 1, the second substrate 2, and the frame member 40. The exhaust port 8 is sealed with a part of the frame member 40.

REFERENCE SIGNS LIST

1 FIRST SUBSTRATE
1a FIRST SURFACE
15 GLASS PANE
2 SECOND SUBSTRATE
2a SECOND SURFACE
25 GLASS PANE
3 THIRD SUBSTRATE
4 SEAL
40 FRAME MEMBER
5 SEALANT
55 FRAME MEMBER
6 INSIDE SPACE
8 EXHAUST PORT
9 GLASS PANEL UNIT
9a GLASS PANEL UNIT
91 WINDOW FRAME
900 GLASS WINDOW
S4 BONDING STEP
S5 PRESSURE REDUCTION STEP
S6 SEALING STEP
S7 SECOND BONDING STEP
S8 FITTING STEP

The invention claimed is:
1. A manufacturing method of a glass panel unit, comprising:
a bonding step of hermetically bonding a first surface on one side in a thickness direction of a first substrate and a second surface on one side in a thickness direction of a second substrate together with a seal having a frame shape, the first substrate including at least a glass pane, the second substrate including at least a glass pane;
a pressure reduction step of reducing a pressure in an inside space surrounded by the first surface, the second surface, and the seal through an exhaust port formed in the first substrate or the second substrate; and
a sealing step of sealing the exhaust port with a reduced pressure in the inside space being maintained, wherein
in the bonding step, sealant is located between the first surface and the second surface to extend along the seal, and in the sealing step, the sealant is deformed, a deformed part of the sealant overlaps the exhaust port in plan view, and the sealant thus deformed seals an opening of the exhaust port.

2. The manufacturing method of the glass panel unit of claim 1, wherein in the pressure reduction step, the sealant is disposed in the inside space and along the seal, and the opening of the exhaust port is located at a space between the sealant and the seal.

3. The manufacturing method of the glass panel unit of claim 2, wherein in the pressure reduction step, the space is formed between the sealant having an L-shape and an L-shaped corner section of the seal.

4. The manufacturing method of the glass panel unit of claim 2, wherein in the bonding step, the first surface and the second surface are bonded together with the seal heated at a first temperature, and in the sealing step, the sealant is heated at a second temperature higher than the first temperature to deform the sealant.

5. The manufacturing method of the glass panel unit of claim 1, wherein in the sealing step, a part of the seal is deformed to seal the opening of the exhaust port.

6. The manufacturing method of the glass panel unit of claim 5, wherein in the bonding step, the first surface and the second surface are bonded together with the seal solidified after being heated and melted, and in the sealing step, the seal is heated and melted again to deform the part of the seal.

7. The manufacturing method of the glass panel unit of claim 1, further comprising a second bonding step of bonding a third substrate to one of the first substrate and the second substrate with a frame member.

8. A manufacturing method of a glass window, comprising a fitting step of fitting a window frame to the glass panel unit manufactured by the manufacturing method of the glass panel unit of claim 1.

* * * * *